United States Patent [19]
Tamata et al.

[11] Patent Number: 6,004,377
[45] Date of Patent: Dec. 21, 1999

[54] SYSTEM FOR COLLECTING AND REFINING $SF_6$ GAS AND METHOD THEREFOR

[75] Inventors: Shin Tamata, Ooarai; Toru Tsubaki, Hitachi; Akio Nadamura; Koji Ito, both of Hitachinaka; Toshio Ohi; Hiromoto Ohno, both of Kawasaki, all of Japan

[73] Assignees: Hitachi Engineering & Services Co., Ltd., Ibaraki; Showa Denko K.K., Tokyo, both of Japan

[21] Appl. No.: 09/097,707

[22] Filed: Jun. 16, 1998

[30] Foreign Application Priority Data

Jun. 20, 1997 [JP] Japan .................................. 9-163715

[51] Int. Cl.$^6$ ........................... B01D 53/04; B01D 15/08
[52] U.S. Cl. ................................ 95/82; 95/119; 95/131; 95/136; 95/138; 95/139; 95/140; 96/101; 96/122; 96/128
[58] Field of Search ............................. 95/82, 117–126, 95/131, 135–140; 96/101–103, 108, 121, 122, 126–128

[56] References Cited

U.S. PATENT DOCUMENTS

| | | | |
|---|---|---|---|
| 3,102,013 | 8/1963 | Skarstrom | 95/122 X |
| 3,619,130 | 11/1971 | Ventriglio et al. | 95/139 X |
| 3,675,392 | 7/1972 | Reighter | 95/131 X |
| 4,369,048 | 1/1983 | Pence | 95/139 X |
| 4,433,981 | 2/1984 | Slaugh et al. | 95/139 |
| 4,449,991 | 5/1984 | Brannon et al. | 95/136 |
| 5,411,707 | 5/1995 | Hiatt | 96/101 X |
| 5,486,227 | 1/1996 | Kumar et al. | 95/117 X |
| 5,520,894 | 5/1996 | Heesink et al. | 95/139 X |
| 5,720,797 | 2/1998 | Yates et al. | 95/135 X |
| 5,759,237 | 6/1998 | Li et al. | 96/108 X |
| 5,762,686 | 6/1998 | Borzio | 95/82 |
| 5,803,953 | 9/1998 | Rojey et al. | 95/136 X |
| 5,833,738 | 11/1998 | Carrea et al. | 95/140 X |

FOREIGN PATENT DOCUMENTS

| | | |
|---|---|---|
| 173 640 | 3/1986 | European Pat. Off. . |
| 24 59 998 | 7/1976 | Germany . |
| 9-856 | 1/1997 | Japan . |
| 2 103 195 | 2/1983 | United Kingdom . |
| WO97/05635 | 2/1997 | WIPO . |

OTHER PUBLICATIONS

Derwent Publications Ltd., Jun. 29, 1994, "Modifid molecular sieve adsorbent for appts.—used for purifying sulphur hexafluoride gas", R. Wang et al.

"1512 An SF6 Gas Collecting Apparatus in a Large Electric Power Test Site", 1996 National Meeting of the Institute of Electric Engineers of Japan.

*Primary Examiner*—Robert Spitzer
*Attorney, Agent, or Firm*—Beall Law Offices

[57] ABSTRACT

$SF_6$ gas is collected from the inside of a gas insulated machine during maintenance and inspection and is refined. Compositions of the refined $SF_6$ gas are analyzed and confirmed to be reusable at the site. In the process of $SF_6$ gas collecting and refining, acidic gases are neutralized and removed by a dry method using filters and the refined $SF_6$ gas is collected in a collecting tank. In particular, after the refining, the composition of the collected $SF_6$ gas is measured and confirmed by analysis equipment to quantitatively confirm whether or not the refined $SF_6$ gas is reusable.

7 Claims, 8 Drawing Sheets

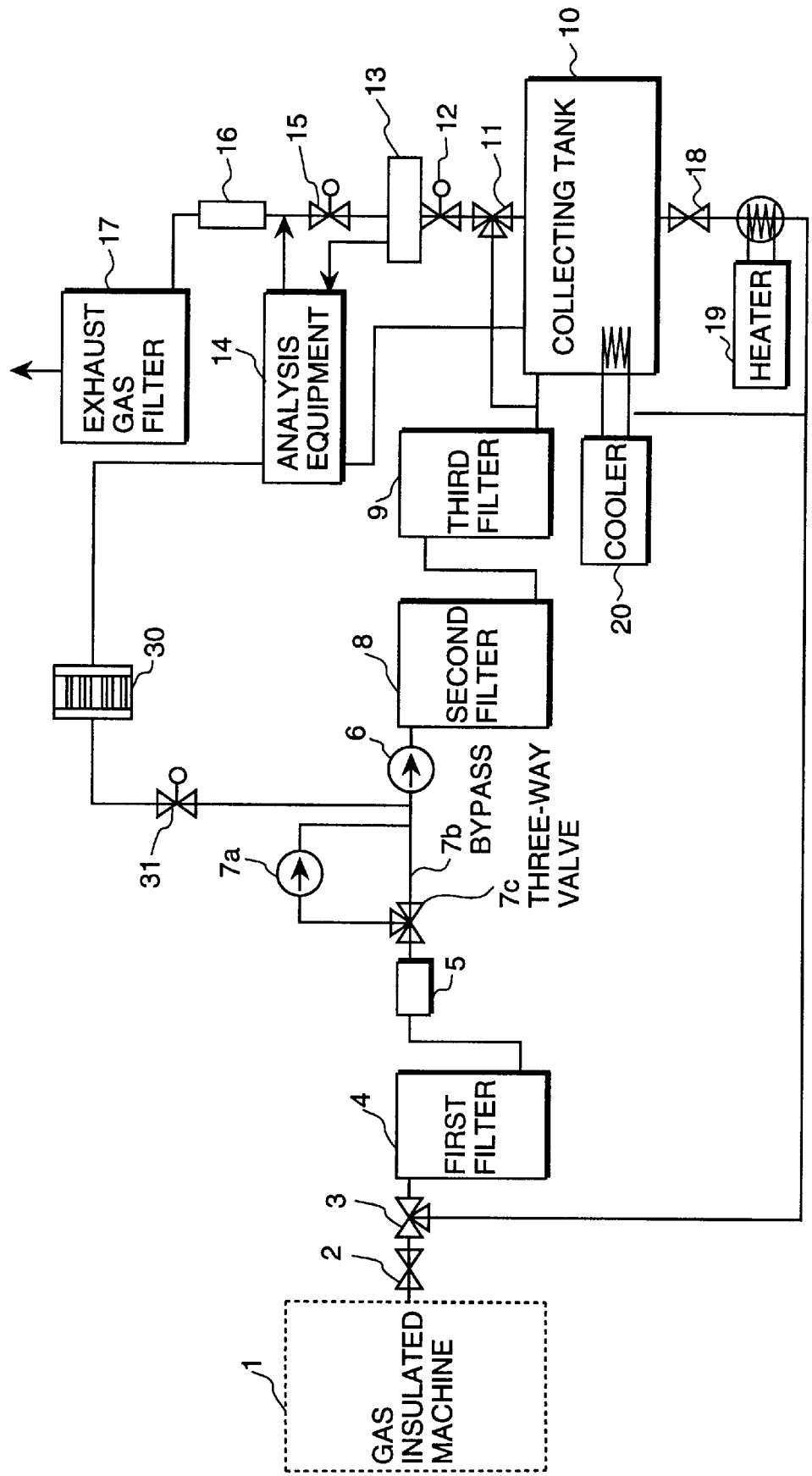

SYSTEM FOR COLLECTING AND REFINING SF$_6$ GAS AND METHOD THEREFOR

BACKGROUND OF THE INVENTION

The present invention relates to a system for collecting and refining SF$_6$ gas at maintenance and inspection of an insulated machine using SF$_6$ gas as an insulating gas and a method therefor and, more particularly, to a system for collecting and refining SF$_6$ gas and a method therefor suitable for recovering a deteriorated SF$_6$ gas by collecting and refining.

Gas insulated machines commonly use SF$_6$ gas which is an inflammable insulating gas. For example, in the past transformers have employed an insulating oil as the insulating material, but an inflammable insulating gas is used instead of the insulating oil because the insulating oil has a probability of occurrence of fire or explosion in a case of trouble. SF$_6$ gas is widely used as the insulating gas. SF$_6$ gas has a global warming property (hereinafter referred to as GWP) coefficient as large as approximately 25000 and accordingly has a large effect on global warming. Therefore, from the viewpoint of global warming prevention, it is preferable to prevent SF$_6$ gas, even a small quantity, from discharging to atmosphere. Further, the density of SF$_6$ gas is approximately five times as large as that of air, so there is a possibility that an accident can be caused resulting in injury or death by oxygen shortage when SF$_6$ gas is discharged inside a room because it stagnates in the bottom portion of the room or the lowermost portion of the building.

Furthermore, it is known that SF$_6$ gas is partly decomposed during use by arc discharge or the like, and part of the decomposed compositions react with moisture to produce acidic gases. Therefore, by-product refining gases are produced. That is, as shown in Table 1, SF$_6$ gas is partly decomposed by discharges or arcing to produce acidic gases and metal fluorides such as HF, SOF$_2$, SO$_2$, H$_2$SO$_3$, SF$_4$, SF$_2$, S$_2$F$_2$ and so on.

TABLE 1

SF$_6$ → SF$_4$, SF$_2$, S$_2$F$_2$, F$_2$, Metal fluorides.
When moisture exists, the following reactions occur.

SF$_4$ + H$_2$O → SOF$_2$ + 2HF
SOF$_2$ + H$_2$O → SO$_2$ + 2HF
SO$_0$ + H$_2$O → H$_2$SO$_3$
SO$_2$ + F$_2$ → SO$_2$F$_2$

In addition to these, there are some reports that CO$_2$ and so on are produced from an organic component such as a winding portion, and that CF$_4$ is partially produced. As described above, although SF$_6$ gas is a useful gas as an insulating gas, SF$_6$ gas has a large global warming property coefficient and accordingly release of SF$_6$ gas to atmosphere is harmful to global warming, and SF$_6$ gas may cause an accident such as oxygen shortage when SF$_6$ gas is discharged inside a room because the density of SF$_6$ gas is large, and in addition to these SF$_6$ gas is harmful because it contains the acidic gases. Therefore, a method of collecting or recovering the deteriorated SF$_6$ gas is also required in view of societal needs.

For the above reasons, at maintenance and inspection of an insulated machine using SF$_6$ gas, a method of collecting and bringing back SF$_6$ gas and refining the SF$_6$ gas to be reused is proposed. For example, a decomposed gas treating system for a SF$_6$ gas insulated electric machine that is disclosed in Japanese Patent Application Laid-Open No.9-856 proposes a method in which acidic gases among by-product gases contained in a deteriorated (used) SF$_6$ gas is removed by bubbling in an alkaline solution and then the SF$_6$ gas is filled in a compressed-gas cylinder to be brought back for refining the SF$_6$ gas.

Further, an article entitled "1512 An SF$_6$ Gas Collecting Apparatus in a Large Electric Power Test Site" presented at the National Meeting of the Institute of Electrical Engineers of Japan (1996) proposes a method in which SF$_6$ gas is refined to a reusable purity by (1) removing metal fluorides, (2) removing decomposed gases, (3) removing moisture and (4) removing impurities using an air removing block. This method removes acidic gases using an alkaline solution, and proposes a system which has a dew-point meter and an oxygen concentration meter so that quantities of moisture and air content can be monitored. This process can satisfy the SF$_6$ gas standard of "IEC-376 New Gas Standard" shown in Table 2.

TABLE 2

| | |
|---|---|
| Moisture | lower than 15 wt ppm |
| Air | lower than 500 wt ppm |
| Hydrolytic fluoride (HF) | lower than 1.0 wt ppm |

Although the need for methods in which deteriorated SF$_6$ gas is collected at inspection and maintenance and refined to be reused is increasing as described above, the technologies disclosed in Japanese Patent Application Laid-Open No.9-856 and described in the article entitled "1512 An SF$_6$ Gas Collecting Apparatus in a Large Electric Power Test Site" presented at the National Meeting of the Institute of Electrical Engineers of Japan (1996) are still technically insufficient to cope with the need. This is because the purity of the refined SF$_6$ gas is still not sufficiently confirmed and guaranteed, and the system for collecting and refining SF$_6$ gas is very large in size.

Initially, the confirmation and guarantee of gas purity will be described. SF$_6$ gas is an important factor to in ensuring the insulation performance of a gas insulated transformer or a gas insulated switch-gear. Therefore, in order to refine and reuse the SF$_6$ gas, it is required to confirm that the performance of the recovered SF$_6$ gas is equivalent to that of new SF$_6$ gas. If the recovered SF$_6$ gas contains impurities and the insulating performance is degraded, the apparatus will be broken and damaged by occurrence of a short circuit inside the apparatus. Therefore, the collection and refinement requires confirmation by measuring the property of the recovered SF$_6$ gas. Table 3 shows an analysis result of an SF$_6$ gas used in a gas insulated switch-gear after repeating open and close switching. In order to confirm that the performance of the recovered SF$_6$ gas is equivalent to that of new SF$_6$ gas, it is necessary to measure the items and to confirm the concentrations. In order to do so, it is necessary to measure the items using measurement apparatuses matching the respective gases.

TABLE 3

Example of a result of analyzing components of a deteriorated SF$_6$ gas

| No. | Item | Contents | Concentration (ppm) |
|---|---|---|---|
| 1 | Solids | Fluorides, Sulfides and others | |
| 2 | Acidic gases | SF$_4$, SF$_2$, S$_2$F$_2$, SOF$_2$, SO$_2$F$_2$, HF and the like | 5000 |

TABLE 3-continued

Example of a result of analyzing components of a deteriorated $SF_6$ gas

| No. | Item | Contents | Concentration (ppm) |
|---|---|---|---|
| 3 | Carbon dioxide | $CO_2$ | 1500 |
| 4 | PFC | $CF_4$, $C_2F_6$, $C_2F_4$ and the like | 1000 |
| 5 | Air | $O_2$, $N_2$ | 600 |
| 6 | Moisture | $H_2O$ | 20 |

Further, since the gas insulated machine can be made small in size compared to that of the conventional method, the gas insulated machine in a substation in a town is usually installed in a basement from the viewpoint of effective use of the site area. In this case, since the gas insulating method has less fire potential compared to the conventional oil insulating method in addition to the advantage of small size, gas insulated machines are widely employed.

On the other hand, there are many substations of the ground installed type in the suburbs. In such cases, when the gas insulated machine capable of having a reduced installation area, it is advantageous.

Since the gas insulated machines are distributedly installed in many sites as described above, it is required that the system for collecting and refining the $SF_6$ gas to reuse it is small and portable. If the system for collecting and refining is not small and portable, it is required to fill the collected gas into a compressed gas-cylinder and to transfer it to a place where a refining apparatus is installed and then after refining to transfer it to the site again. Therefore, the time period of the inspection process is lengthened and substantial work is required for carrying in and out the compressed-gas cylinder. In a case where new $SF_6$ gas is filled after a deteriorated $SF_6$ gas is collected, the delay in time period of the inspection process can be avoided, but the work for carrying in and out of the compressed-gas cylinder of the collected gas and the compressed-gas cylinder of new $SF_6$ gas is still required. In addition to this, the treatment of the collected deteriorated $SF_6$ gas is required. In the case of a basement substation, the amount of work required for the carrying in and out of the collecting and refining system and of the compressed-gas cylinders becomes large and the size of the transportation port also becomes a limitation. Therefore, a small sized collecting and refining system is required.

Both of Japanese Patent Application Laid-Open No.9-856 and the article entitled "1512 An $SF_6$ Gas Collecting Apparatus in a Large Electric Power Test Site" presented at the National Meeting of the Institute of Electrical Engineers of Japan (1996) propose a wet method of refining deteriorated $SF_6$ gas where acidic gases are removed by passing the deteriorated $SF_6$ gas through lime-water solving calcium hydroxide in saturation. However, since the solubility of calcium hydroxide is small (0.16 g/100 g water at 20° C.) and accordingly the amount of the solution becomes large when it is used in an aqueous solution, there are problems in that the size of the apparatus becomes large and that a large amount of waste water is produced and a lot of time and effort are required in the transportation and treatment of the waste water. Particularly, since the waste water has a potential of leakage, the waste water needs to be carefully handled and managed, and there are various kinds of problems in handling the waste water in a limited place such as a basement.

Since the conventional $SF_6$ gas collecting system has only a gas collecting function but not a gas refining function, the conventional $SF_6$ gas collecting system is designed based on the viewpoint of how fast $SF_6$ gas is collected from a gas insulated machine in order to improve work efficiency. When $SF_6$ gas is filled in a gas insulated machine, for example, at a pressure of 5 kg/cm$^2$, the $SF_6$ gas is firstly collected into a collecting tank until the pressure of the collecting tank and the pressure of the gas insulated machine reaches equilibrium by opening a communicating pipe line, and then the remaining $SF_6$ gas is collected into the collecting tank using a compressor or a vacuum pump.

In a case of employing this method, the pressure at the machine side is decreased from 5 kg/cm$^2$ to approximately 3 kg/cm$^2$ within 1 to 2 minutes after opening the communicating pipe line. Then, the remaining $SF_6$ gas is collected using the compressor. However, approximately ⅓ of the gas has been collected by the opening of the communicating pipe line. Since the efficiency of the compressor decreases as the pressure in the machine side is decreased, the amount of collected gas per unit time is decreased as the compressor is operated and the amount of collected gas per unit time reaches the minimum at the end of the collecting work.

In a case where the processing rate of gas per unit time in the refining process is varied regardless of whether the process is of a wet method or a dry method, the refining process system needs to be designed so as to meet the maximum processing gas flow rate. In a case where the concentration of acidic gases in the $SF_6$ gas is reduced down to a predetermined value, design of the system of the wet method is performed by determining a used amount of alkaline solution to a unit volume of the treated gas (ratio of solution to gas) to a predetermined value. On the other hand, in a case of the dry method, the design is also performed by determining a ratio of the treated gas volume treated in unit time to a volume of an adsorption removing agent (SV value). Therefore, the system needs to be designed so as to meet the maximum gas flow rate when the processed gas rate varies, which leads to problems in that the system becomes large in size and consequently optimization and small-sizing of the system cannot be attained. Further, when the gas flow rate exceeds the value of design condition, a large amount of the alkaline solution is carried over by the gas in a case of the wet method to cause a trouble in the following process. Furthermore, regardless of the dry method or the wet method, there occurs a problem in that the initial removing performance cannot be attained.

SUMMARY OF THE INVENTION

A first object of the present invention is to provide a system for collecting and refining $SF_6$ gas and a method of collecting and refining $SF_6$ gas which are small-sized and easily operable in collection and refinement of $SF_6$ gas from an $SF_6$ gas insulated machine.

A second object of the present invention is to provide a system for collecting and refining $SF_6$ gas and a method of collecting and refining $SF_6$ gas which are capable of measuring and confirming compositions of $SF_6$ gas and capable of reusing the $SF_6$ gas in a short time at a working site of the $SF_6$ gas collecting and refining processing.

In order to attain the first object described above, a system for collecting and refining $SF_6$ gas in accordance with the present invention is characterized by comprising a first filter connected to a gas insulated machine; a constant flow rate supplier connected to a downstream side of the first filter; a compressor and a vacuum pump connected in parallel to a downstream side of the constant flow rate supplier; a collecting tank connected to a downstream side of the compressor; and a cooler for cooling the collecting tank, wherein the first filter is constructed by a filter filled with a dry adsorbent.

In addition to this, the system for collecting and refining $SF_6$ gas is characterized by further comprising a constant flow rate valve arranged in an inlet side of said compressor.

In order to attain the first object described above, a method of collecting and refining $SF_6$ gas in accordance with the present invention is characterized by comprising the steps of removing impurities from $SF_6$ gas from a gas insulated machine by averaging a flow rate of the $SF_6$ gas and letting the $SF_6$ gas flow through a first filter filled with a dry adsorbent; adsorbing and removing by-product gases by a second filter filled with a dry adsorbent; and collecting the $SF_6$ gas separated by the second filter by cooling and liquefying the $SF_6$ gas.

In order to attain the second object described above, a system for collecting and refining $SF_6$ gas in accordance with the present invention is characterized by comprising at least a second filter arranged between the compressor and the collecting tank; and analysis equipment including a gas chromatograph in a downstream side of the second filter.

In order to attain the second object described above, a method of collecting and refining $SF_6$ gas in accordance with the present invention is characterized by comprising the step of confirming compositions of the collected $SF_6$ gas by analyzing composition analysis items of moisture concentration, acidic gas concentration, carbon dioxide concentration, oxygen or nitrogen concentration and PFC concentration, and repeating the process of confirming said compositions and a process of returning the collected $SF_6$ gas to the first filter until the compositions become preset values.

BRIEF DESCRIPTION OF THE DRAWINGS

These and other objects, features and advantages of the present invention will be understood more clearly from the following detailed description with reference to the accompanying drawings, wherein

FIG. 8 is a diagram showing the construction of a modification of the embodiment of FIG. 7 of a system for collecting and refining $SF_6$ gas using a film filter.

DESCRIPTION OF THE PREFERRED EMBODIMENTS

Figure 1:
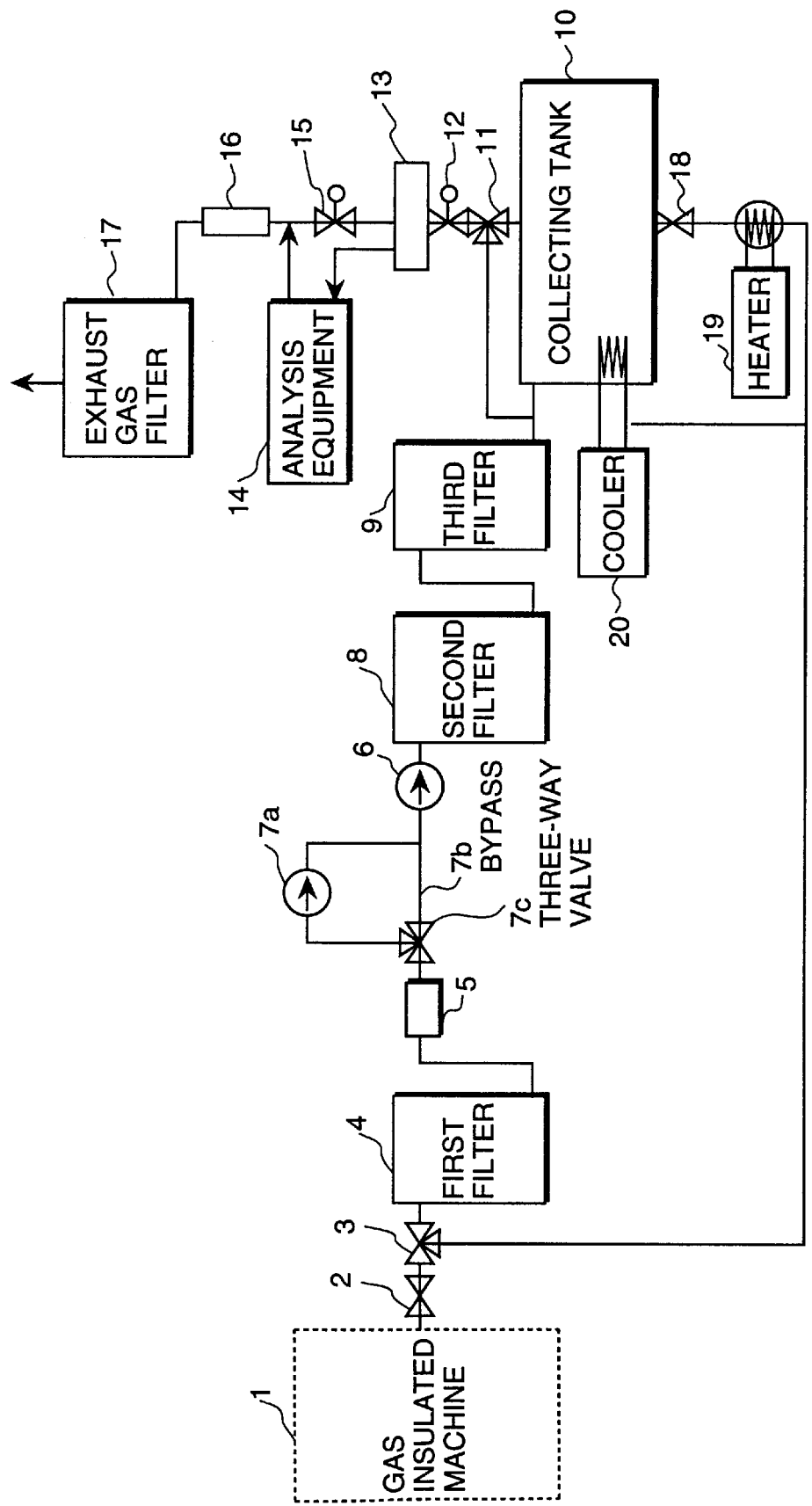
FIG. 1 is a diagram showing the construction of a first embodiment of a system for collecting and refining $SF_6$ gas in accordance with the present invention.
Figure 2:
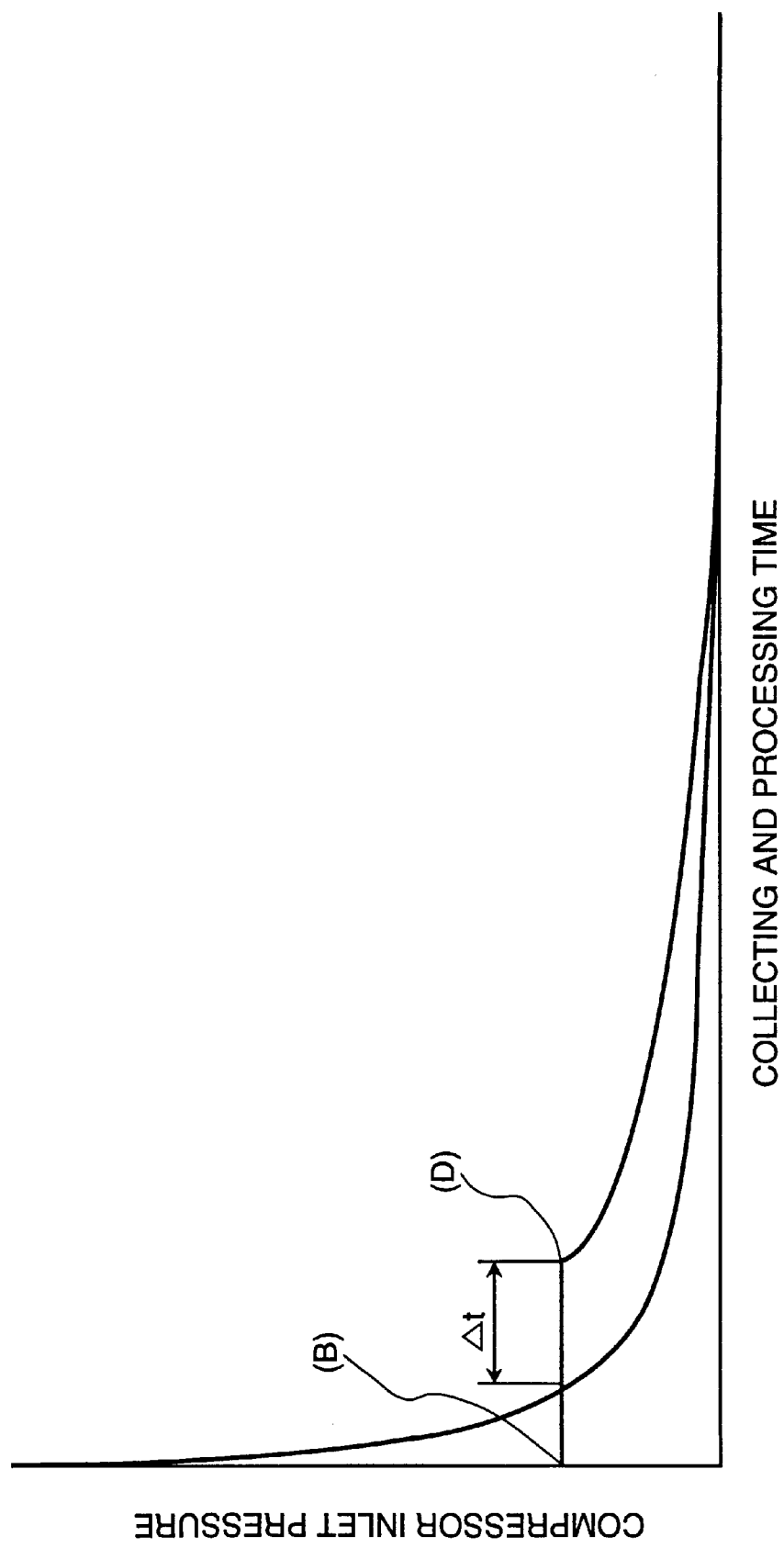
FIG. 2 is a graph showing the relationship between collecting processing time and compressor inlet pressure.
Figure 3:
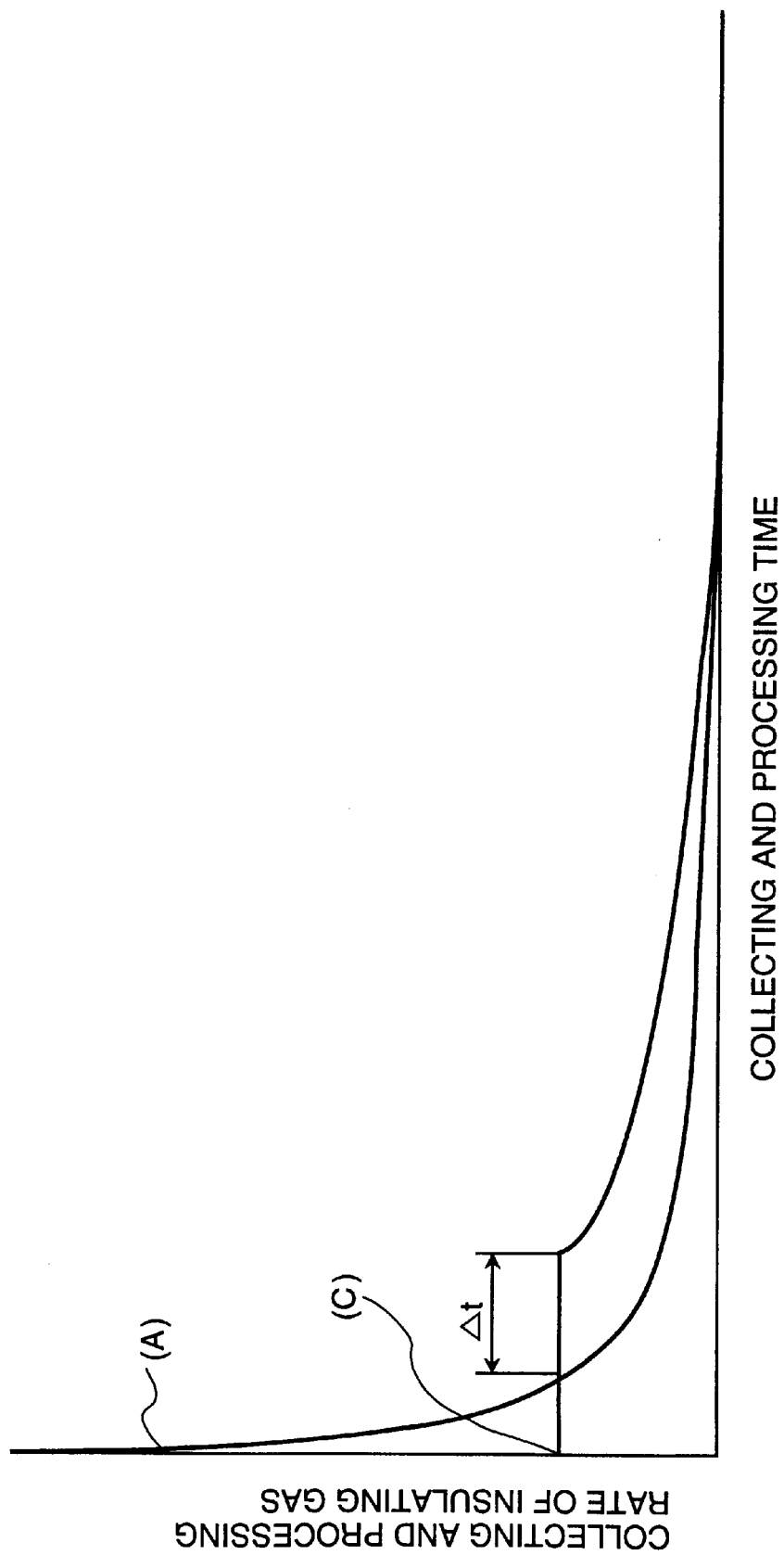
FIG. 3 is a graph showing the relationship between collecting processing time and collecting and processing rate of insulating gas.

A first embodiment of the present invention will be described below, referring to FIG. 1 to FIG. 3. FIG. 1 is a diagram showing the construction of a first embodiment of the system for collecting and refining $SF_6$ gas. FIG. 2 is a graph showing the relationship between collecting processing time and compressor inlet pressure. FIG. 3 is a graph showing the relationship between collecting processing time and collecting and processing rate of insulating gas.

The system for collecting and refining $SF_6$ gas of this embodiment is constructed as follows. As shown in FIG. 1, a gas insulated machine 1 is connected to a first filter 4 through a dividing valve 2 and a dividing three-way valve 3. An insulating gas, $SF_6$, of 10 m$^3$ at 5 kg/cm$^2$ is filled in the gas insulated machine 1. The first filter 4 is connected to a second filter 8 through a constant flow rate supplier 5 and a compressor 6. A vacuum pump 7a and a by-pass pipe 7b are arranged between the constant flow rate supplier 5 and the compressor 6 in parallel, and a flow path of the vacuum pump 7a or the by-pass pipe 7b is selected through a three-way valve 7c. The three-way valve 7c connects the constant flow rate supplier 5 and the compressor 6 through the by-pass pipe 7b in the initial stage of operation, and connects the constant flow rate supplier 5 and the compressor 6 through the vacuum pump 7a when the pressure in the gas insulated machine 1 is decreased. Here, a pressure reducing valve is used as the constant flow rate supplier 5. The second filter 8 is connected to a third filter 9. The third filter 9 is connected to a collecting tank 10 having a cooler 20, and the collecting tank 10 is connected to a sampling header 13 through a sampling position switching valve 11 and a pressure reducing valve 12. The sampling header 13 is connected to an analysis equipment 14 and also connected to a flow meter 16 through an exhaust gas valve 15. Further, the analysis equipment 14 and the flow meter 16 are connected to each other in the downstream of the exhaust gas valve 15. The flow meter 16 is connected to an exhaust filter 17. On the other hand, the collecting tank 10 is connected to the dividing three-way valve 3 through a discharge valve 18 and a heater 19, and a branch portion is arranged between the heater 19 and the three-way valve 3, and the branch portion is connected to the sampling position switching valve 11.

Operation of the system for collecting and refining $SF_6$ gas constructed as described above will be described below. A deteriorated insulating gas in the gas insulated machine 1 is supplied to the first filter through the three-way valve by opening the dividing valve 2. The pressure reducing valve as the constant flow rate supplier 5 is fully closed. When the dividing valve 2 is opened and the inlet pressure at the constant flow rate supplier 5 becomes nearly equal to the pressure in the gas insulated machine, the pressure reducing valve is gradually opened and controlled so that the outlet pressure of the pressure reducing valve becomes 1.5 kg/cm$^2$. Under this state, the compressor 6 is started to operate to start collecting of the $SF_6$ gas. Since the pressure reducing valve is controlled so as to maintain the inlet pressure of the compressor to 1.5 kg/cm$^2$, the collecting capacity of the compressor 6 is maintained at a constant value. Therefore, the collecting and processing rate of the $SF_6$ gas can be maintained at a constant value. Thereby, required amounts of adsorbent, neutralizer and the like can be minimized to achieve necessary and minimum values. For example, the collecting amount of the $SF_6$ gas per unit time in the initial stage is set to 1 N m$^3$/min. Further, a fluid resistor such as an orifice or the like may be used as the constant flow rate supplier 5.

Since among impurities contained in the gas it is necessary to separate acidic gases and solid components such as fluorides and sulfides which adversely affect machines, the neutralizing and removing agent is arranged inside the first filter 4 at a place in the upstream side of the compressor 6 and the vacuum pump 7. Since the first filter 4 is depressurized to a negative pressure of 10 Torr in the last stage, a neutralizing and removing agent of a physically adsorbing type is not preferable but a neutralizing and removing agent of a calcium group alkali base is preferable. The reason is that the neutralizing and removing agent of a physically adsorbing type has a characteristic of discharging substances once having been adsorbed under a depressurized condition, and accordingly activated carbon is not suitable. Therefore, in this embodiment, a granular neutralizing and removing agent having main components of $CaO$ and $Ca(OH)_2$ is used. The neutralizing and removing agent fixes the acidic gases as calcium salts, and water produced by the fixing reaction is absorbed in $CaO$ and carbon dioxide is also fixed and removed as carbonic salts by $CaO$ and $Ca(OH)_2$. A quantity of the neutralizing and removing agent to a quantity of the gas to be processed is set to $SV=500$ $h^{-1}$. Since the processing rate of the gas is 1 N $m^3$/min (60 N $m^3$/h), the quantity of the neutralizing and removing agent becomes approximately 120 liters. By doing so, the concentration of acidic gas after processed can be reduced below 1 ppm. Further, the solid components of fluorides and chlorides are also filtered and removed by the granular adsorbent layer.

An adsorbent selectively adsorbing a strong acidic gas of HF gas is contained in the first filter 4 to adsorb HF gas while the insulating medium is passing through the vessel of the first filter and to neutralize the insulating medium as a result. The method of neutralizing can be employed is a general neutralizing method of allowing the gas to pass through an alkaline solution. A dry neutralizing method of using an adsorbent can improve handling capability since no alkaline solution is used.

By using the granular neutralizing and removing agent having main components of $CaO$ and $Ca(OH)_2$ to the first filter, the acidic gas after processed can be removed and the water produced in an approximately equivalent quantity of the acidic gases accompanied by removing the acidic gases can be also removed. Further, carbon dioxide and solid components can be also removed and separated. Since the removal is performed by chemically changing the acidic gases and the like to the other substances to fix and separate, the removed substances cannot be released again even if the pressure of the first filter is depressurized down to near a vacuum during the collecting operation. In addition to these, since the components and the pipes in the system line up to the first filter 4 is exposed to the acidic gases, the components and pipes are protected by nickel plating (Kanigin plating) or the like.

The gas with the acidic gases removed by the first filter 4 is supplied to the second filter 8 through the compressor 6. An adsorbent composed of activated carbon or zeolite as the main component is used for the second filter 8. The second filter 8 is arranged for backing up the first filter 4 and for adsorbing and separating by-product gases other than the acidic gases. The second filter 8 cannot be not brought in a negative pressure condition since it is arranged in the downstream side of the compressor 6 and the vacuum pump 7, and accordingly the substances once adsorbed and separated cannot be released again. Since an activity of adsorbing reaction of the activated carbon or the zeolite is high, the amount of the adsorbent of the second filter 8 is 60 liters by setting $SV=1000$ $h^{-1}$.

The gas of which the by-product gases have been adsorbed and separated by the second filter is supplied to the third filter 9. In the third filter 9, a molecular sieve is used for removing moisture, and the moisture concentration can be reduced to nearly zero by the back-up of the first filter 4. Since the absorbing characteristic of the molecular sieve is excellent, the amount of the molecular sieve is 30 liters by setting $SV=2000$ $h^{-1}$.

The deteriorated $SF_6$ gas processed by the individual filters as described above is collected and stored in the collecting tank 10 by being cooled and liquefied using the cooler 20. The $SF_6$ gas in the collecting tank 10 is separated into a gas phase and a liquid phase, and a part of the $SF_6$ gas in the gas phase in the upper portion of the collecting tank 10 is supplied to the analysis equipment 14 through the pressure reducing valve 12 and the sampling header 13 to perform composition analysis of the collected gas. Since the $SF_6$ gas is cooled and liquefied, non-condensable gases are gathered in the $SF_6$ gas in gas phase in the upper portion of the collecting tank 10 to increase the impurity concentration. The analysis equipment 14 comprises an acidic gas detector, a gas chromatograph, an oxygen meter and a dew point meter. The concentration of the acidic gases is measured by the acidic gas detector, and the concentrations of the carbon dioxide and the PFC gas are measured by the gas chromatograph. Further, the concentration of the air is measured by the oxygen meter, and the concentration of the moisture is measured by the dew point meter.

The supply of gas to the analysis equipment 14 is continuously performed, and accordingly the latest gas composition of the collected gas is analyzed and confirmed. The gas after completed the analysis is discharged to the external through the exhaust gas filter 17 which is filled with activated carbon or the like. The $SF_6$ gas is adsorbed in the exhaust gas filter 17 to prevent the $SF_6$ gas having a large global warming property coefficient from leaking to outside the system. Otherwise, instead of using the exhaust gas filter 17, the exhaust gas may be collected into a vinyl bag or the like and the collected gas may be burned in an incinerator since the quantity of the exhaust gas is small.

If it is judged from the analysis result of the gas compositions by the analyzing equipment 14 that the purity of the gas does not reach the target value, the discharge valve 18 of the collecting tank 10 is opened, and the liquefied gas is heated with the heater 19 to be vaporized and returned to the first filter 4 through the dividing three-way valve 3.

As described above, the process of confirming the compositions and the process of returning the collected $SF_6$ gas to the first filter until the compositions become the target values.

Although air among the impurities leaks and mixes into the system, it is difficult to separate some of non-condensable gases such as air by adsorbing and removing. Therefore, if a result of the analysis shows that the concentration of air is high, the impurities such as air is selectively exhausted by opening the exhaust gas valve 15 to exhaust the gas in the gas phase of the collecting tank while the flow rate is being confirmed using the flow meter 16 because air ($O_2$, $N_2$) is a non-condensable gas having a lower condensing temperature compared to $SF_6$ gas and exists in the gas phase. PFC gas and carbon dioxide having lower condensing temperatures compared to $SF_6$ gas can also be selectively exhausted externally in the similar manner. In that time, the $SF_6$ gas is prevented from being discharged outside the system by the exhaust gas filter 17. Further, similar to the above, the exhaust gas may be collected into a vinyl bag or the like and the collected gas may be burned in an incinerator since the quantity of the exhaust gas is small.

As the collection of the $SF_6$ gas is progressed in the manner as described above, pressure in the gas insulated machine 1 is gradually decreased and becomes lower than a set value of the pressure reducing valve as the constant flow rate supplier 5. Although the pressure reducing valve is in the fully opened state at that time, the collecting rate is decreased lower than the preset value and cannot exceed the design flow rate of the filter because the efficiency of the blower is decreased due to lowering of the pressure. The collection of the $SF_6$ gas is further progressed, and at the time when the pressure reaches approximately −0.1 to −0.2 $kg/cm^2$, the vacuum pump 7 is started to operate and the $SF_6$ gas is collected using both machines. Finally, the $SF_6$ gas is collected as much as possible by reducing the pressure inside the gas insulated machine 1 up to 10 Torrs. By doing so, the amount of the remaining $SF_6$ gas inside the gas insulated machine 1 can be reduced and accordingly the amount of discharged $SF_6$ gas can be reduced. At the time of completion of collection, the final analysis of composition of the collected gas is performed to confirm that the composition is within the range of the required condition. Then, the gas insulated machine is opened to perform inspection and maintenance of the inside portions. After completion of the inspection and maintenance, the inside of the gas insulated machine 1 is evacuated to 10 Torrs to exhaust the air inside the gas insulated machine 1. Then, the collected and refined $SF_6$ gas is refilled in the gas insulated machine 1.

The refilling is performed by opening the exhaust valve 18 and heating and gasifying the cooled and liquefied $SF_6$ gas using the heater 19 to supply the $SF_6$ gas to the gas insulated machine 1. At that time, the composition of the refilled gas is analyzed and confirmed by switching the sampling position switching valve 11.

The $SF_6$ gas gasified by the heater 19 is supplied to the gas insulated machine 1 through the dividing three-way valve 3 and the dividing valve 3. In a case where the analysis result of the gas composition after collection and refining of the $SF_6$ gas shows that the purity of the gas is not sufficient, similar to the case of refilling after opening the exhaust valve 18 and heating and gasifying the cooled and liquefied $SF_6$ gas using the heater 19, the $SF_6$ gas is supplied to the first filter 4 through the dividing three-way valve 3 to repeat the same process as the process at collecting and refining time.

New $SF_6$ gas is additionally supplied from a compressed gas cylinder by the amount of the $SF_6$ gas consumed by being decomposed inside the gas insulated machine 1 and the amount of the $SF_6$ gas consumed by the analysis and the like so that a necessary amount of $SF_6$ gas is filled in the gas insulated machine. Further, the $SF_6$ gas adsorbed to the activated carbon in the exhaust gas filter 17 is burning-treated together with the activated carbon and not discharged outside the system.

By removing and separating the by-produced impurity gases contained in the deteriorated $SF_6$ gas not by wet but by the dry processing as described above, the system for collecting and refining $SF_6$ gas of this embodiment can be made small not only in the size of the adsorbing and removing components but also in the size of the total system. For example, when calcium hydroxide of 100 g is used as the saturated aqueous solution, the volume becomes approximately 63 liters because the solubility is small. When calcium hydroxide of 100 g is used as a 5% concentration aqueous solution, the volume becomes approximately 2 liters. However, it is necessary to stir the solution uniformly.

On the other hand, when calcium hydroxide is formed in granular shape or particle shape and used by dry method, volume of calcium hydroxide of 100 g is approximately 0.14 liter since the bulk density is approximately 0.7 g/cc. Even if the available efficiency is assumed to be nearly 70% because of dry method, the volume becomes only approximately 0.2 liter. By treating the gas by the dry method as described above, the volume of the system can be reduced below 1/10. Further, the amount of the secondary waste can be also reduced below 1/10, and can be easily handled because no liquid waste is produced.

In addition to these, it is preferable from the viewpoint of work efficiency that the work of collecting the $SF_6$ gas from the gas insulated machine is performed at the installation site of the gas insulated machine, and after completion of inspection the refined $SF_6$ gas collected from the gas insulated machine is refilled to the gas insulated machine. However, it is generally necessary that the measurement of the collected $SF_6$ gas is performed by sending the samples to a factory or a place where analysis equipment is present to be measured. Since the work needs to be temporarily stopped in such a case, new $SF_6$ gas is often filled in the gas insulated machine. This is because the gas insulated machine is an electric supply infrastructure apparatus which is required to be recovered in a short time.

The system for collecting and refining $SF_6$ gas of this embodiment has an equipment capable of quantitatively analyzing and measuring the compositions of the collected and refined $SF_6$ gas in place, and accordingly it is possible to judge at the collecting site whether or not the $SF_6$ gas is reusable and to smoothly perform reuse of the $SF_6$ gas. That is, the measurement of the gas can be performed by selecting a measurement apparatus for each of the gases as shown in Table 4. By combining the analysis equipment for gas composition with the system for collecting and refining $SF_6$ gas and by measuring and confirming the composition of the gas after collecting and refining it in place in a short time, as described above, after refining the collected $SF_6$ gas the refined gas can be speedily and effectively reused.

TABLE 4

Examples of applicable measurement apparatus

| No. | Item | Measurement Apparatus | Measurable Lower Limit (ppm) |
| --- | --- | --- | --- |
| 1 | Acidic gases | Acidic gas detector, Gas chromatograph | approximately 0.5 |
| 2 | Carbon dioxide | Gas chromatograph | approximately 0.5 |
| 3 | PFC | Gas chromatograph | approximately 10 |
| 4 | Air | Oxygen meter | approximately 10 |
| 5 | Humidity | Dew point meter, Humidity meter | approximately 5 |

A key point of improving work efficiency in the conventional system is how to collect the $SF_6$ gas in a short time, and consideration is paid only on collecting the $SF_6$ gas, but not on averaging the collecting flow rate. However, in order to reuse the $SF_6$ gas, how to refine the $SF_6$ gas to a high purity is an important factor to improve the work efficiency. If the purity is low, the $SF_6$ gas cannot be reused or the $SF_6$ gas needs to be refined again.

The maximum flow rate during the collecting period occurs in the initial period of the collecting work. That is, the maximum flow rate during the collecting period occurs in a period of 1 to 2 minutes when the pressures in the gas insulated machine and the collecting tank become in balance after connecting the gas insulated machine filled with $SF_6$ gas to the collecting tank with a communicating pipe and opening the communicating pipe, and in the following short period when the compressor for collecting the gas is started to operate and the pressure inside the gas insulated machine is reduced to a certain value. Since the compressor more efficiently collects the gas as the pressure in the suction side is higher, the efficiency is decreased as the pressure in the suction side decreases and consequently the collecting flow rate is reduced as the pressure in the suction side decreases. The maximum flow rate occurs in the period of opening the communicating pipe and the following short period after starting the compressor. Therefore, by performing constant flow rate control of the collecting flow rate during those periods, the collecting time is lengthened by 10 to 20% compared to that in the conventional system. However, the collecting flow rate can be made constant and averaged, the processing system can be made small in size, and the refining processing can be improved.

Figure 5:
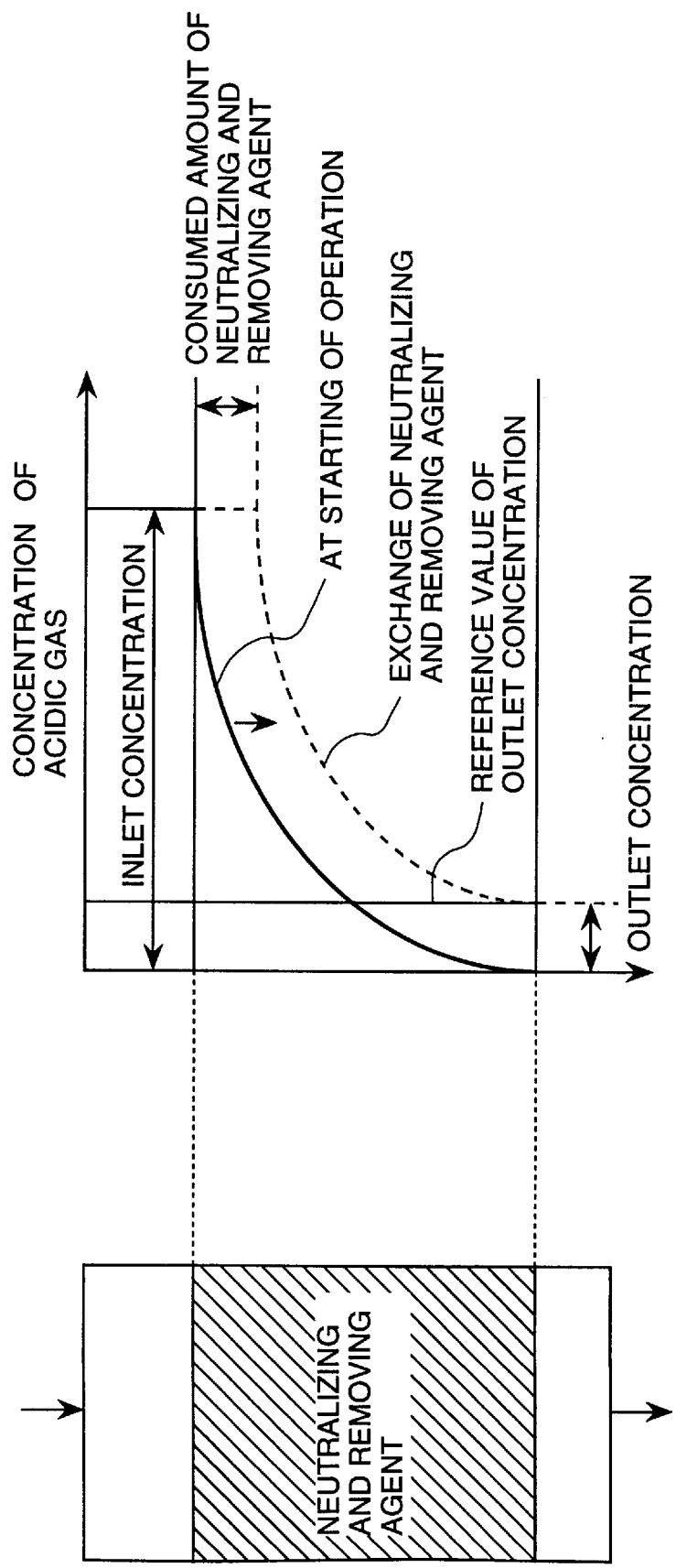
FIG. 5 is a graph showing change of concentration of processed gas with operation of a neutralizing and removing agent.

In the past, collection of the $SF_6$ gas has been performed in a manner as shown by the broken line in FIG. 5. That is, collection of the $SF_6$ gas is started when the inlet pressure of the compressor of the collecting system is a value equal to the pressure in the gas insulated machine, and the inlet pressure is rapidly decreased as shown in FIG. 2 as the collection of the $SF_6$ gas is progressed. During the period, the collecting flow rate changes along the curve shown in FIG. 3 which is similar to the pressure change shown in FIG. 2. However, the maximum process capacity of the refining apparatus needs to have a process capacity meeting to the point A.

On the other hand, according to the present invention, since the pressure reducing valve 5 is arranged in the inlet of the compressor 6 of the collecting system and the $SF_6$ gas is collected with keeping the inlet pressure of the compressor 6 and controlling the collecting flow rate to a constant flow rate, the collecting characteristic becomes as shown by the solid line in FIG. 5. Since the inlet pressure of the compressor is kept constant at the value of the point B, the collecting flow rate is also kept constant. When the pressure in the gas insulated machine side is decreased lower than a preset value of the pressure reducing valve, the pressure reducing valve is fully opened at the point D and the inlet pressure of the compressor is decreased to decrease the collecting flow rate. By doing the constant flow rate control of the collecting flow rate, the time period necessary for collecting and refining the $SF_6$ gas is lengthened by Δt, but it is lengthened only by 10 to 20% compared to the total time period. By doing so, the process capacity of the system for collecting and refining can be reduced from the point A to the point C. Thereby, the necessary process capacity can be reduced to ⅓ to ¼.

Figure 4:
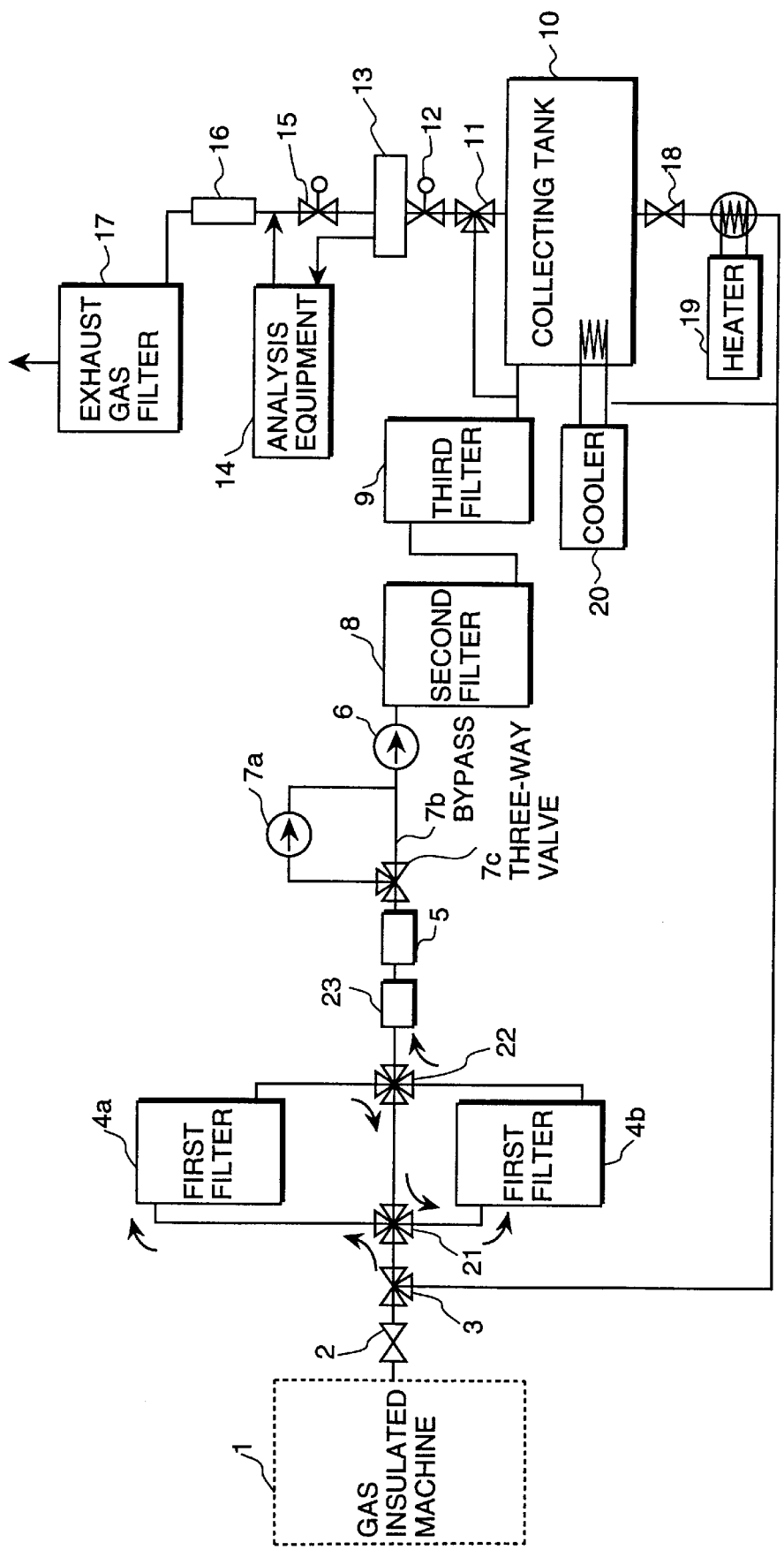
FIG. 4 is a diagram showing the construction of a second embodiment of a system for collecting and refining $SF_6$ gas in accordance with the present invention.

A second embodiment of the present invention will be described, referring to FIG. 4 and FIG. 5. FIG. 4 is a diagram showing the construction of this embodiment of a system for collecting and refining $SF_6$ gas. FIG. 5 is a graph showing change of concentration of processed gas with operation of a neutralizing and removing agent.

The system for collecting and refining $SF_6$ gas of this embodiment is constructed similarly to the embodiment shown in FIG. 1. However, in this embodiment, a four-way switching valve 21 and a four-way switching valve 22 are arranged in the downstream side of the dividing three-way valve 3, and two first filters 4a, 4b are arranged in parallel through the four-way switching valve 21 and the four-way switching valve 22. The two first filters 4a, 4b are connected double in parallel as shown in FIG. 4 to improve the availability of the neutralizing and removing agent.

It is confirmed that the concentration of the acidic gases is the highest among the impurities in the deteriorated $SF_6$ gas from an inspection and analysis result of compositions of the deteriorated $SF_6$ gas. In a case of adsorption or reaction fixing, an effective amount of the adsorbent or the neutralizing and removing agent is decreased with operation and the adsorbent needs to be exchanged because of reducing of the removing efficiency. It can be understood from FIG. 5 showing change of concentration of the processed gas with operation of the neutralizing and removing agent that when processing is performed by filling a designed amount of the neutralizing and removing agent, the concentration of the acidic gases is gradually decreased in the inside of the filter and at the outlet the acidic acid can be removed below a desired concentration, as shown by the solid line. However, when the neutralizing and removing agent in the inlet portion of the filter is gradually consumed with operation, the concentration of the acidic gases inside the filter changes as shown by the broken line and the filled neutralizing and removing agent needs to be exchanged in order that the concentration of the acidic gases at the outlet attains the reference concentration. In this case, although the amount of the consumed neutralizing and removing agent is far less than a half of the total amount, the whole amount of the filled agent needs to be exchanged because the initial performance as the filter cannot be displayed.

Therefore, in this embodiment, two sets of the first filters filled with Ca group alkali having the largest load are used by arranging them in series as shown in FIG. 4. The collected $SF_6$ gas is initially supplied to the first filter 4a by switching the flow path using the four-way switching valve 21. The deteriorated $SF_6$ gas having passed through the first filter 4a is supplied to the first filter 4b through the four-way switching valve 22 and the four-way switching valve 21 to remove the acidic gases.

When the concentration of the acidic gas exceeds the reference value by monitoring the outlet concentration of the acidic gas using an acidic gas monitor 23, the neutralizing and removing agent filled in the first filter 4a is exchanged and the flow path is changed so that the deteriorated $SF_6$ gas flows through in order of the four-way switching valve 21, the first filter 4b, the four-way switching valve 22, the four-way switching valve 21, the first filter 4a, the four-way switching valve 22 and the compressor 6. By operating in such a manner, the total amount of the neutralizing and removing agent in each of the filters can be consumed, and consequently the amount of the neutralizing and removing agent used can be reduced to approximately ½ compared to that in a case of operating one set of the filters. As a result, in addition of the reduction in the procurement cost of the neutralizing and removing agent, the disposal cost of the secondary waste can be reduced to ½ and the system can be made smaller since the availability of the neutralizing and removing agent can be increased twice.

Figure 6:
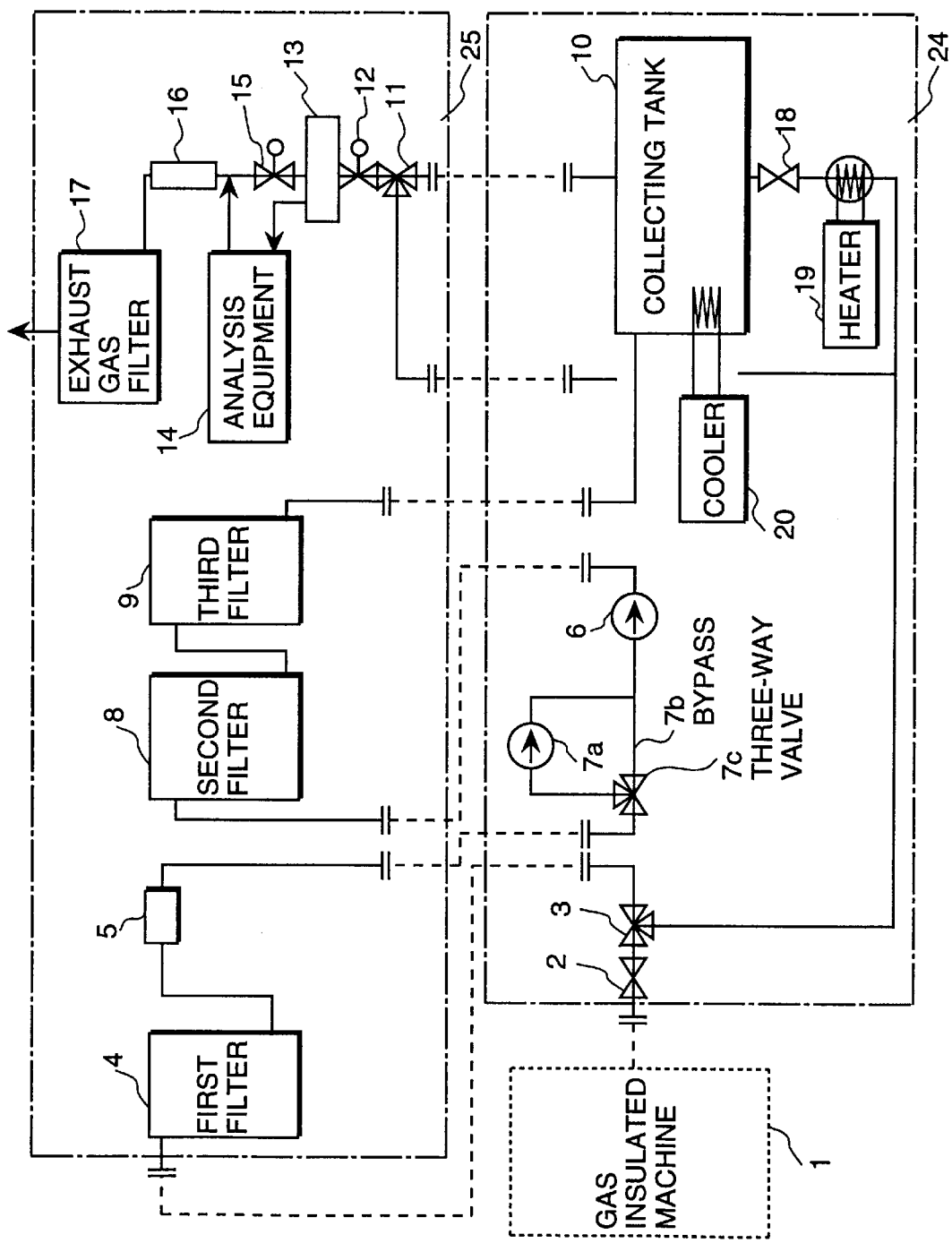
FIG. 6 is a diagram showing the construction of a third embodiment of a system for collecting and refining $SF_6$ gas in accordance with the present invention.

A third embodiment of the present invention will be described, referring to FIG. 6. FIG. 6 is a diagram showing the construction of this embodiment of a system for collecting and refining $SF_6$ gas.

As shown in FIG. 6, the collecting and refining system of this embodiment is constructed by combining an existing $SF_6$ gas collecting system 24 and an existing $SF_6$ gas refining system 25. In order to collect the $SF_6$ gas from the gas insulated machine, the $SF_6$ gas collecting system 24 is used. The existing $SF_6$ gas collecting system 24 is designed not in taking the refining process into consideration, but has only a function to collect the $SF_6$ gas from the gas insulated machine 1. By adding a gas refining function to this system, the existing system can be effectively used as a series of systems for collecting and refining $SF_6$ gas. The added $SF_6$ gas refining system 25 is mainly composed of filters and a composition analysis equipment 14 for collected gas.

The $SF_6$ gas collecting system 24 collects the $SF_6$ gas from the gas insulated machine 1 to the collecting tank 10 through the dividing valve 2 and the dividing three-way valve 3 using the compressor 6 and the vacuum pump 7, and the collected $SF_6$ gas is cooled in the collecting tank 10 by the cooler 20 to be liquefied. When the gas is refilled, the $SF_6$ gas is supplied to the gas insulated machine 1 through the dividing three-way valve 3 and the dividing valve 2 by opening the discharge valve 18 of the collecting tank 10 and heating using the heater 19 to evaporate the $SF_6$ gas.

When the $SF_6$ gas collecting system 24 and the $SF_6$ gas refining system 25 are combined, the system structure and the operation become as follows. The $SF_6$ gas in the gas insulated machine 1 is supplied to the first filter 4 through the dividing valve 2 and the dividing three-way valve 3. The dividing three-way valve 3 and the first filter 4 is connected by a pressure resistant and vacuum proof hose or pipe. The $SF_6$ gas passed through the first filter 4 is supplied to the compressor 6 or the vacuum pump 7 of the $SF_6$ gas collecting system 24 from the $SF_6$ gas refining system 25 through the constant flow rate supplier 5. The $SF_6$ gas compressed by the compressor 6 or the vacuum pump 7 is supplied to a second filter 8 and a third filter 9 to remove impurities and then stored in the collecting tank 10. In the collecting tank 10, the $SF_6$ gas is cooled to be liquefied.

By separating into the collecting system and the refining system as the $SF_6$ gas collecting system 24 and the $SF_6$ gas refining system 25, each system can be made smaller and better in portability. Further, when there is an existing collecting system, a series of collecting $SF_6$ gas and refining $SF_6$ gas can be performed by adding a new $SF_6$ gas refining system 25.

Figure 7:
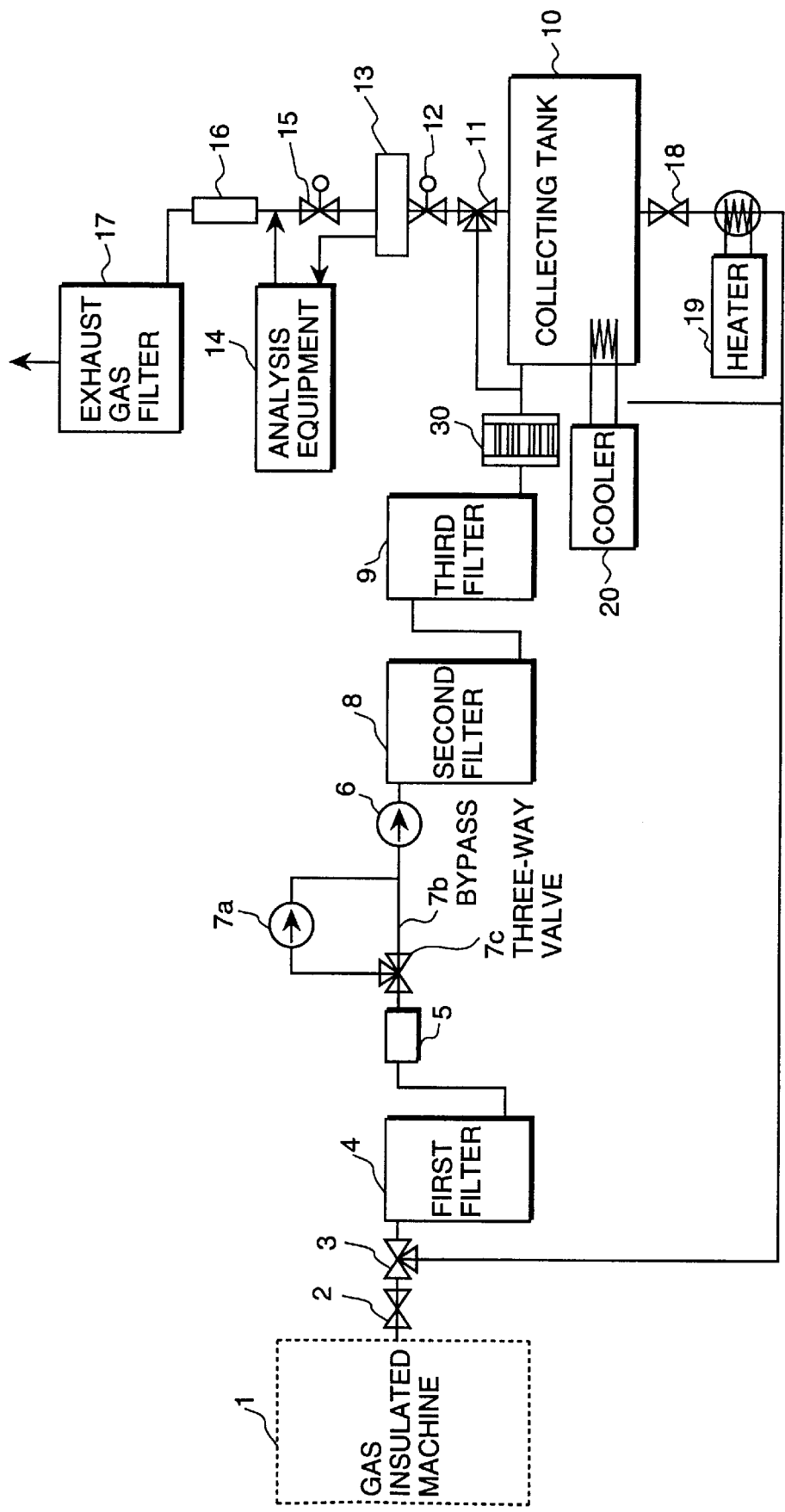
FIG. 7 is a diagram showing the construction of a fourth embodiment of a system for collecting and refining $SF_6$ gas using a film filter in accordance with the present invention.

A fourth embodiment of the present invention will be described, referring to FIG. 7 and FIG. 8. Each of FIG. 7 and FIG. 8 is a diagram showing the construction of this embodiment of a system for collecting and refining $SF_6$ gas.

The system for collecting and refining $SF_6$ gas of this embodiment is constructed similar to the embodiment shown in FIG. 1. However, in the system for collecting and refining $SF_6$ gas of this embodiment, a fourth filter 30 is arranged between the third filter 9 and the collecting tank 10. In the fourth filter 30, a porous hollow thread film for selectively separating air is installed.

A produced amount, that is, a concentration of gas component composition produced in the deteriorated $SF_6$ gas in which $SF_6$ gas is deteriorated is seldom deviated largely from the values shown in Table 3. However, air enters into the system by in-leakage from the outside of the system, and the concentration of air possibly becomes 100 times or 1000 times of the concentration shown in Table 1 if even one of fastened positions is loosed. Further, in order to reduce an amount of $SF_6$ gas discharged to atmosphere, before releasing the gas insulated machine, the inside of the system other than the gas insulated machine is brought to a considerable vacuum condition in order to evacuation-collect $SF_6$ gas as much as possible. In this condition, potential of air to leak into the system from outside the system is increased.

On the other hand, air containing $N_2$, $O_2$ can be adsorbed and removed to a certain degree by an adsorbent of active carbon group, but the amount is as small as approximately 1% of the amount of the adsorbent. Therefore, the air soon breaks through the absorbent. The air may be discharged out of the system from the collecting tank 10 as a non-condensable gas. However, this case is not preferable because the $SF_6$ gas is also released outside the system together with the air. Therefore, it is necessary to selectively separate and remove only the air among the collected gases.

This embodiment realizes the selective separation and removal of the air using a porous hollow thread film having selective property. The acidic gases and the carbon dioxide gas accompanied by the $SF_6$ gas are removed by the first filter 4, and the by-product gases are removed in the second filter 8. Further, the moisture is removed in the third filter 9. The air containing $N_2$, $O_2$ is separated and removed by the porous hollow thread film filter in the fourth filter 30. This makes use of that the molecular diameters of $N_2$, $O_2$ gases are smaller than the molecular diameters of $SF_6$ gas, and only $N_2$, $O_2$ gases are separated and released outside the system using the film having a hole diameter through which $N_2$, $O_2$ gases pass but $SF_6$ gas does not pass. The gas is pumped into the fourth filter 30 by the compressor 6. Therefore, it is sufficient to place the film having the required property and no driving source for pressurizing the supplied gas is necessary because a positive pressure acts in the forth filter. Different from the filter of filling agent type, the film filter can cope with a large amount of air in-leaking because the film filter cannot be broken through by the air, and the film filter does not produce the secondary waste such as a disposed filling agent (disposed adsorbent).

In the embodiment shown in FIG. 8, the fourth filter 30 is arranged between the collecting tank 10 and the inlet of the compressor 6, and a branch portion is arranged in a position of the upstream side of the compressor 6 and the downstream side of the vacuum pump 7, and the forth filter 30 is connected to the branch portion through a pressure reducing valve 31. The fourth filter 30 is further connected to the analysis equipment 14, and the porous hollow thread film is arranged for selectively separate air is installed in the fourth filter 30.

In the embodiment shown in FIG. 8, the gas passes through the fourth filter 30 only once. In the system of FIG. 8, a predetermined amount of the gas is re-circulated by supplying the gas from the gas phase portion of the collecting tank 10 where the concentration of air of a non-condensable gas is high to the inlet portion of the compressor 6 through the pressure reducing valve 31. The re-circulation flow rate is controlled by the pressure reducing valve 31. Since the collecting tank 10 in this case is in a positive pressure, no driving source for applying a positive pressure to the film is necessary.

As described above, the efficiency of separating and removing the air can be substantially improved by re-circulating the gas in the gas phase portion where the concentration of air of a non-condensable gas is high in the collecting tank 10 and processing the gas using the fourth filter 30. Further, since this filter is of a film separating type, the secondary waste is not produced.

According to the system for collecting and refining $SF_6$ gas of the present invention, the deteriorated $SF_6$ gas is efficiently collected from the gas insulated machine, and impurities accompanying with the $SF_6$ gas are separated and removed, and the composition of the collected $SF_6$ gas can be measured and confirmed. Therefore, collecting, refining and reusing of the deteriorated $SF_6$ gas can be speedy performed at the installation site of the machine. Thereby, it is possible to prevent the $SF_6$ gas harmful to the global environment from being released to the atmosphere, and to make effective use of resources. Further, by using the dry type filter for the refining process, it is possible to make the system small in size, to keep the portability of the system and to reduce the amount of the secondary waste.

What is claimed is:

1. A method of collecting and refining $SF_6$ gas, the method comprising the steps of:

removing impurities from $SF_6$ gas from a gas insulated machine by averaging a flow rate of the $SF_6$ gas and letting the $SF_6$ gas flow through a first filter filled with a dry adsorbent;

adsorbing and removing by-product gases by a second filter filled with a dry adsorbent; and collecting the $SF_6$ gas separated by said second filter by cooling and liquefying the $SF_6$ gas.

2. A method of collecting and refining $SF_6$ gas according to claim 1, the method further comprising the step of confirming compositions of said collected $SF_6$ gas by analyzing compositions on analysis items of moisture concentration, acidic gas concentration, carbon dioxide concentration, any one of oxygen and nitrogen concentration and PFC concentration; and repeating said process of confirming said compositions and a process of returning said collected $SF_6$ gas to said first filter until said compositions become target values.

3. A system for collecting and refining $SF_6$ gas comprising a first filter connected to a gas insulated machine; a constant flow rate supplier connected to a downstream side of said first filter; a compressor and a vacuum pump connected in parallel to a downstream side of said constant flow rate supplier; a collecting tank connected to a downstream side of said compressor; and a cooler for cooling said collecting tank, wherein said first filter is constructed by a filter filled with a dry adsorbent.

4. A system for collecting and refining $SF_6$ gas according to claim 3, which further comprises a constant flow rate valve arranged in an inlet side of said compressor.

5. A system for collecting and refining $SF_6$ gas according to claim 3, wherein said first filter is constructed by a filter filled with a calcium group alkali.

6. A system for collecting and refining $SF_6$ gas according to claim 3, which comprises at least a second filter arranged between the compressor and said collecting tank; and an analysis equipment including a gas chromatograph in a downstream side of said second filter.

7. A system for collecting and refining $SF_6$ gas according to claim 3, which further comprises a returning pipe for returning $SF_6$ gas in said collecting tank to said gas insulated machine.

* * * * *